United States Patent
Carter et al.

(10) Patent No.: US 8,091,964 B2
(45) Date of Patent: Jan. 10, 2012

(54) BLAST MITIGATING SEAT

(75) Inventors: James A. Carter, Bedford, MA (US);
Donald MacLeod, Millbury, MA (US);
Patrick Callahan, Maynard, MA (US)

(73) Assignee: Foster-Miller, Inc., Waltham, MA (US)

( * ) Notice: Subject to any disclaimer, the term of this patent is extended or adjusted under 35 U.S.C. 154(b) by 230 days.

(21) Appl. No.: 12/454,892

(22) Filed: May 26, 2009

(65) Prior Publication Data

US 2010/0301647 A1 Dec. 2, 2010

(51) Int. Cl.
*B60N 2/42* (2006.01)
*A47C 7/02* (2006.01)
(52) U.S. Cl. .................. 297/216.17; 297/284.3
(58) Field of Classification Search ............. 297/216.19, 297/216.17, 284.9, 284.3, 474, 216.15, 216.16, 297/337, 484, 468, 344.1
See application file for complete search history.

(56) References Cited

U.S. PATENT DOCUMENTS

| | | | |
|---|---|---|---|
| 4,928,575 A | 5/1990 | Smirlock et al. | |
| 5,170,690 A | 12/1992 | Smirlock et al. | |
| 5,191,166 A | 3/1993 | Smirlock et al. | |
| 5,333,532 A * | 8/1994 | Smirlock et al. | 89/36.02 |
| 5,803,544 A * | 9/1998 | Block et al. | 297/284.3 |
| 6,257,663 B1 * | 7/2001 | Swierczewski | 297/216.19 |
| 6,672,667 B1 * | 1/2004 | Park | 297/344.1 |
| 2004/0026981 A1 * | 2/2004 | Maloney et al. | 297/474 |
| 2007/0035167 A1 * | 2/2007 | Meyer | 297/344.19 |
| 2008/0018156 A1 * | 1/2008 | Hammarskjold et al. | 297/354.1 |
| 2008/0284222 A1 * | 11/2008 | Draeger et al. | 297/284.3 |
| 2010/0083819 A1 | 4/2010 | Mann et al. | |

* cited by examiner

*Primary Examiner* — Milton Nelson, Jr.
(74) *Attorney, Agent, or Firm* — Iandiorio Teska & Coleman

(57) ABSTRACT

A blast mitigating seat features a base and a seat frame. The seat frame includes a pan and a backrest including an open area for gear worn by a user. A first damping subsystem between the base and the seat frame has a first force/stroke relationship and a second damping subsystem between the base and the seat frame has a second force/stroke relationship.

37 Claims, 6 Drawing Sheets

BLAST MITIGATING SEAT

GOVERNMENT RIGHTS

Aspects of this invention were made with U.S. Government support under Contract No. W911QX-04-C-0028 awarded by the Army Research Laboratory. The Government may have certain rights in the invention.

FIELD OF THE INVENTION

The subject invention relates to seats, particularly seats for military vehicles.

BACKGROUND OF THE INVENTION

Military vehicles such as the HMMWV were not typically designed with soldier comfort in mind. Instead, the driving force behind the design of such vehicles is ruggedness, the ability to traverse difficult terrain, and protection of the vehicle occupants. In some military vehicles, for example, the seats for the vehicle occupants are no more than metal benches.

Terrorists have long used weapons such as rocket-propelled grenades, (RPGs) mines, IEDs, and other explosives in an attempt to defeat military vehicles.

Armor for such military vehicles is known and disclosed in patents such as U.S. Pat. Nos. 4,928,575; 5,170,690; 5,191,166; and 5,333,532. There have also been attempts to design military vehicles to withstand blasts from beneath the vehicle.

And, offerings are now being made for more ergonomic and crashworthy seats for military vehicles. See, for example, U.S. published patent application No. U.S. 2008/0018156 incorporated herein by this reference.

Still, the market is desirous of more advanced seating technologies. For example, seats with crushable pads and/or panels may not adequately protect the occupant from all blasts or dynamic events. In some cases, even large military vehicles have suffered blasts which lift the entire vehicle several feet into the air. The shock of the vehicle returning to the ground is quite severe. Many known damping systems failed to take into account these secondary impact events.

BRIEF SUMMARY OF THE INVENTION

The subject invention, in one aspect, features a new seat which mitigates against both primary and secondary blast impacts, a seat which is ergonomically designed, which allows quick ingress and egress, which is comfortable, which can be used in connection with many different style platforms, which is lightweight, which occupies little space, and which can be mounted to the floor, ceiling, or a bulkhead of a military or other vehicle. The subject invention, however, is not limited to the above objects.

The subject invention results from the realization, in part, that, in one example, a more ergonomic and yet highly protective seat includes a backrest with an open area for the soldier's backpack (or camelbak) and adjustable pads along with one damping subsystem primarily designed to absorb the force of a primary impact event and another damping subsystem primarily designed to absorb the force of a secondary impact event.

One blast mitigating seat in accordance with the subject invention includes a base and a seat frame including a pan and a backrest including an open area for gear worn by a user. A first damping subsystem between the base and the seat frame has a first force/stroke relationship and a second damping subsystem between the base and the seat frame has a second force/stroke relationship. Rails may be included between the seat frame and the pan for adjusting the pan fore and aft. In one example, the backrest includes two spaced columns attached to the seat frame. Each column typically includes spaced pads. Select pads may include an adjustment mechanism for adjusting the position of the pad on the column and the angle of the pad.

Typically, the first damping subsystem and the second damping subsystem are configured to dissipate forces driving the seat frame down and the first damping subsystem is configured to dissipate forces driving the seat frame up. The first damping system may apply a force $F_1$ over a stroke $S_2$ and the second damping subsystem may apply a force $F_2$ over a stroke $S_2$. Preferably, $F_2$ is greater than $F_1$ and $S_2$ is less than $S_1$.

In one design, the base includes a bottom plate and spaced risers extending upwards therefrom. In this example, the first damping subsystem includes a piston-style shock absorber between each riser and the seat frame.

A spall liner may be included on the pan. One restraint subsystem includes lap belt members and should strap members all releasably received in a single buckle. Preferably, each lap belt member and each shoulder strap member extend from an automatic retracting mechanism.

In one example, the second damping subsystem is a piston-style shock absorber and includes a piston connect to the seat frame and a cylinder connected to the seat base. The cylinder, in one example, includes first and second different size cavities. Springs between the base and the seat frame may also be provided.

The subject invention also features a blast mitigating seat comprising a base including a bottom plate and spaced rearward risers extending upwards therefrom and a seat frame including a pan adjustable with respect to said frame and a backrest including spaced columns extending upwardly from the seat frame. Each column includes one or more adjustable pads. A shock absorber extends between each riser and the seat frame. First and second snubbers are between the seat frame and the base.

One blast mitigating seat in accordance with the subject invention includes a base and a seat frame including a pan and a backrest including an open area for gear worn by a user. There are means for dissipating forces driving the seat frame down and means for dissipating forces driving the seat frame up.

In one example, the means for dissipating forces driving the seat frame up includes at least one damper applying force a force $F_1$ over a stroke $S_1$, the means for dissipating forces driving the seat frame down includes at least one damper applying a force $F_2$ over a stroke $S_2$, $F_2>F_1$, and $S_2<S_1$.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
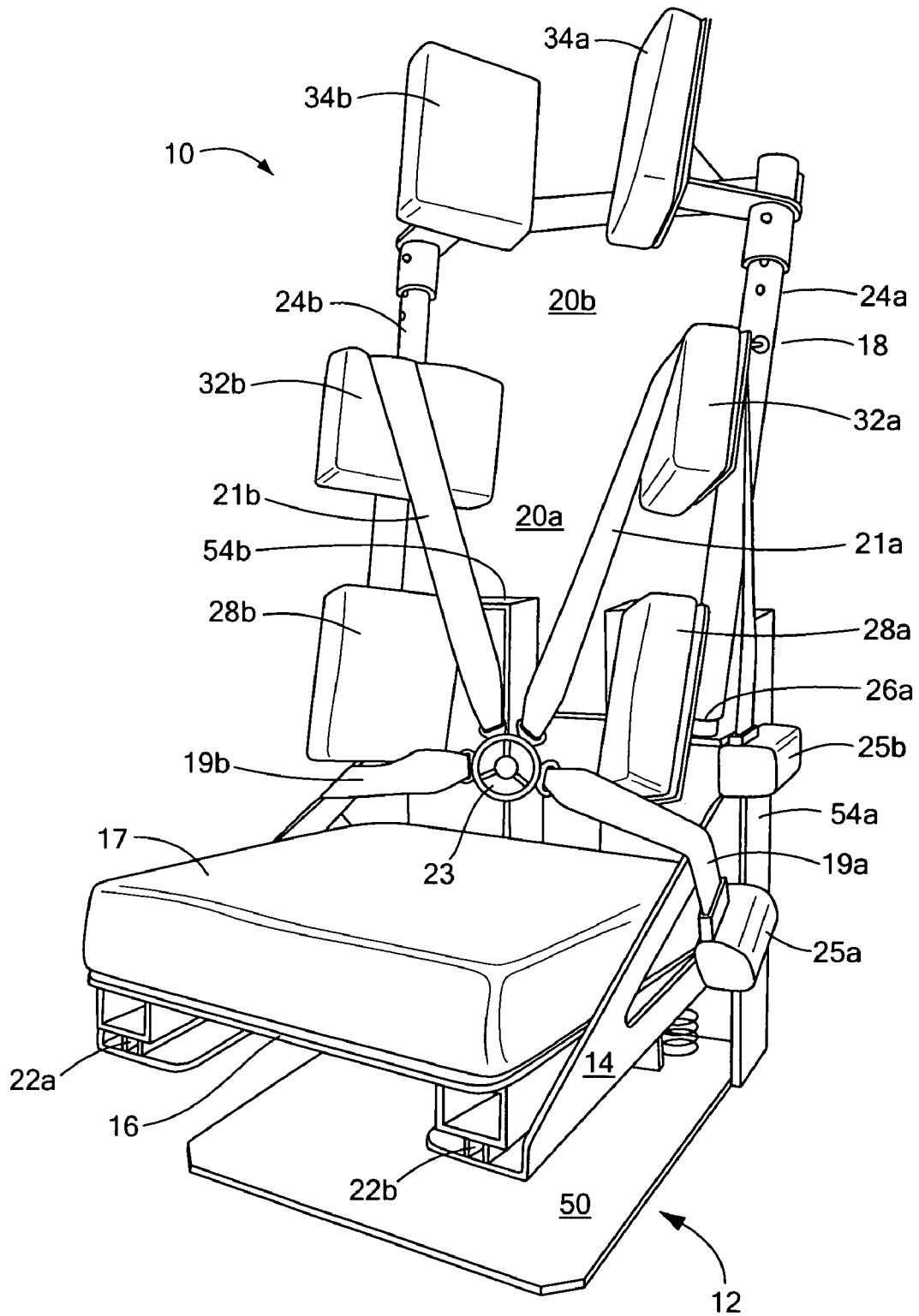
FIG. 1 is a schematic three-dimensional front view of an example of a blast mitigating seat in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows an example of blast mitigating seat 10 in accordance with the subject invention. Base 12 is securable to the floor, ceiling, or bulkhead of a vehicle which includes military ground vehicles and also aircraft and/or seagoing vessels. Seat frame 14 includes pan 16 and backrest 18 including open areas 20a and 20b to accommodate gear worn by the user. Base 12, pan 16, and backrest 18 may be made of aluminum or steel. Rails 22a and 22b between frame 14 and pan 16 allow pan 16 to be adjusted fore and aft using a handle assembly (not shown).

Figure 2:
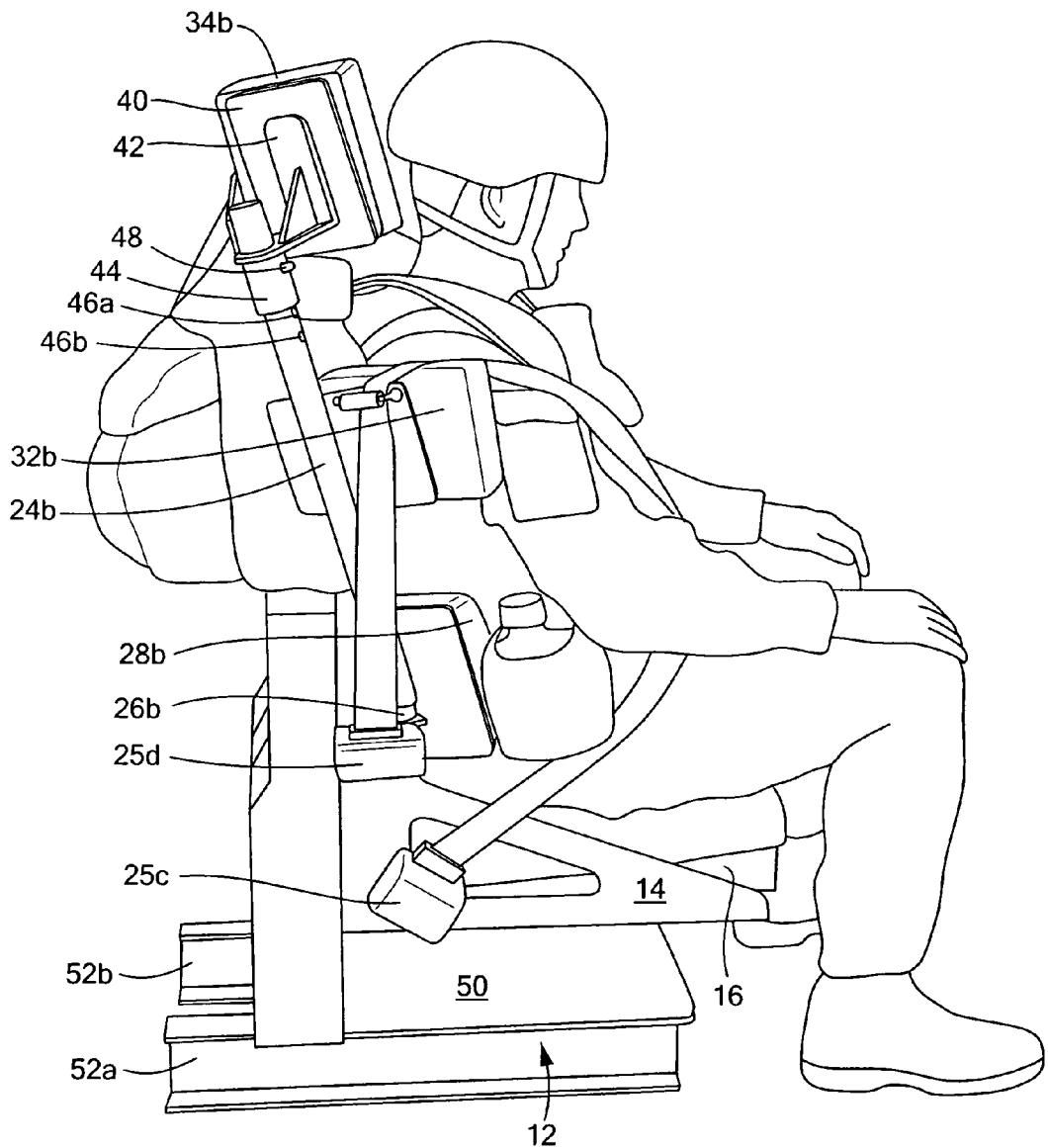
FIG. 2 is a schematic three-dimensional side view of the seat of FIG. 1.

In this particular version, backrest 18 includes spaced columns 24a and 24b attached to seat frame 14 as shown at 26a and 26b, FIG. 2, respectively. Spaced pads 28a and 28b are typically fixed with respect to columns 24a and 24b, respectively. Pads 32a and 32b and 34a and 34b are adjustable with respect to their respective columns. Preferably, both the longitudinal position of these pads and their angles are adjustable to accommodate users between the $5^{th}$ and $95^{th}$ percentiles.

Figure 3:
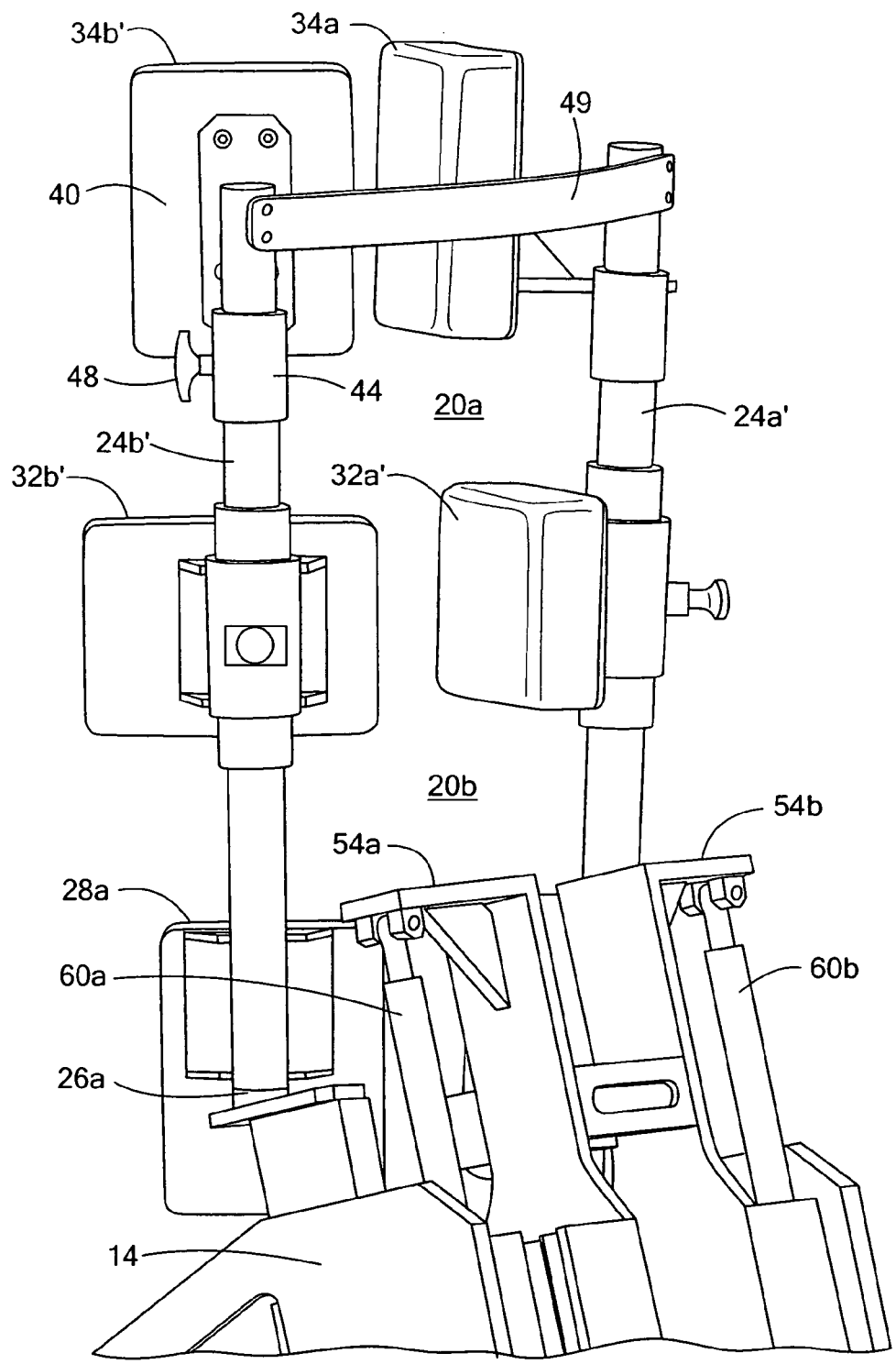
FIG. 3 is a schematic three-dimensional rear view of the back rest section of a blast mitigating seat in accordance with an example of the subject invention.

For example, FIG. 2 shows pad 34b secured to plate 40 of bracket 42 including collar 44 slideably disposed over column 24b. There is a socket laterally through collar 44 and two or more rows of holes through column 24b. In FIG. 2, holes 46a and 46b of one row can be seen. Pin 48 is releasably received through the socket in collar 44 and two holes in column 24b to fix the longitudinal position and angle of pad 32b depending upon which row of holes is chosen in the column. Similar mechanisms are associated with pads 32a', 32b' and 34a'. FIG. 3 also shows these features as well as cross member 49 between columns 24a' and 24b'.

Base 12, FIGS. 1-2, in this example, includes bottom plate 50 shown bolted to vehicle members 52a and 52b in FIG. 2. Base 12 also includes spaced rearward upwardly extending risers 54a and 54b, FIGS. 1-2, as explained below.

Spall liner 17 can be included on pan 16. See U.S. patent application Ser. Nos. 11/820,692 and 11/999,345 by the applicant hereof incorporated herein by this reference. The restraint subsystem preferably includes lap belts 19a and 19b and shoulder strap members 21a and 21b all releasably secured in buckle 23. Retracting mechanisms 25a-d automatically retracts belt members 19a, 19b and 21a, 21b when released from buckle 23 for easy ingress and egress from the seat.

The subject invention in the preferred embodiment also features dual damping means. There are means primarily designed to dampen primary impacts and means primarily designed to dampen secondary impacts.

Figure 4:
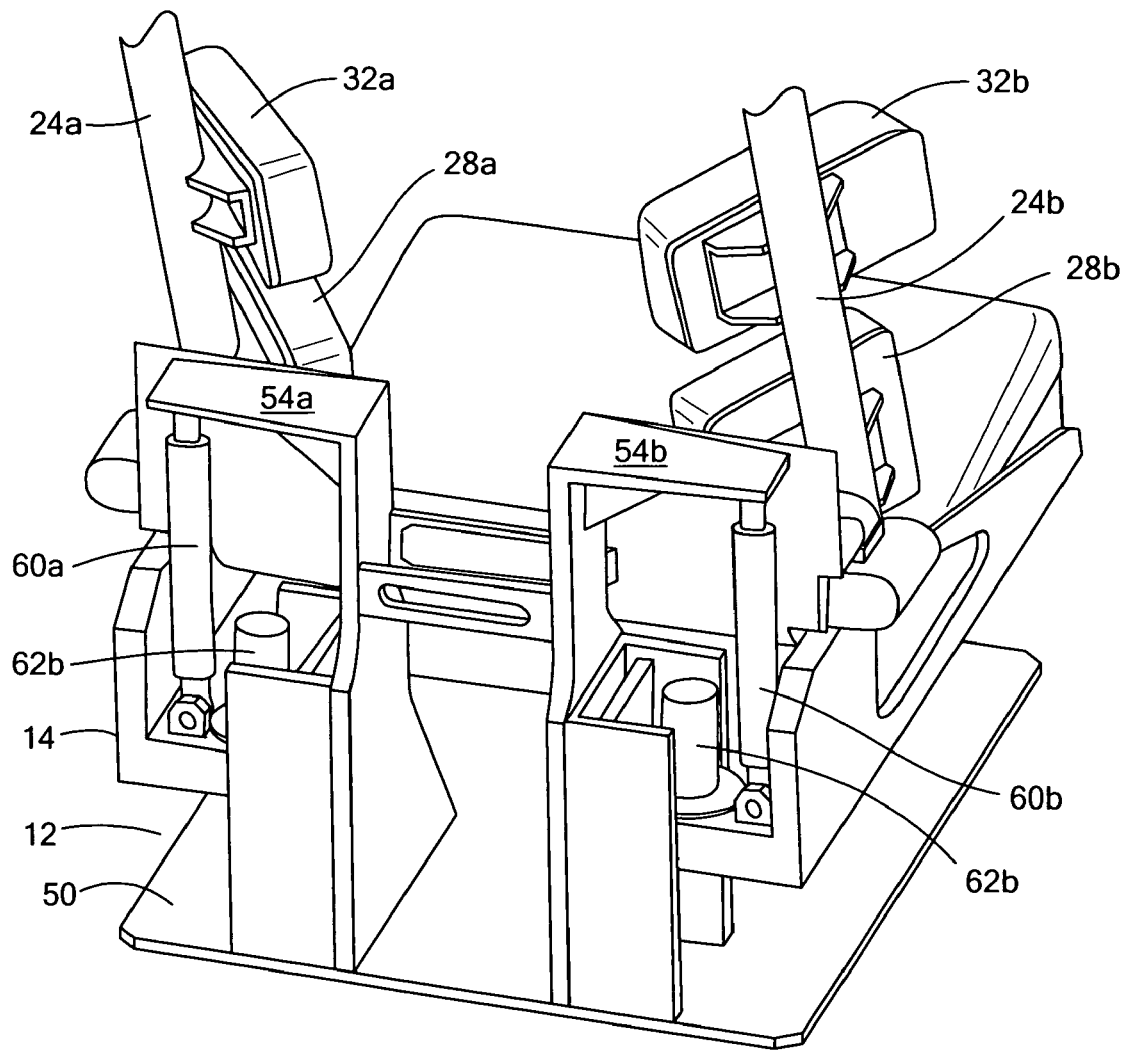
FIG. 4 is a schematic three-dimensional rear view of the base section of the seat shown in FIG. 3.

As shown best in FIG. 4, dampers, e.g., shock absorbers 60a and 60b connect base risers 54a and 54b, respectively, to seat frame 14. These dampers have a first force/stroke relationship, e.g., they each apply a force $F_1$ and a stroke $S_i$ primarily designed to dampen forces experienced by the seat due to a secondary event (e.g., the vehicle returning to the ground after a primary or blast event).

Dampers 62a and 62b, e.g., snubbers, each have a second force/stroke relationship, e.g., they each supply a force $F_2$ over a stroke $S_2$ and are primarily designed to dampen forces experienced by the seat due to a primary event (e.g., a blast event).

Figure 5A:
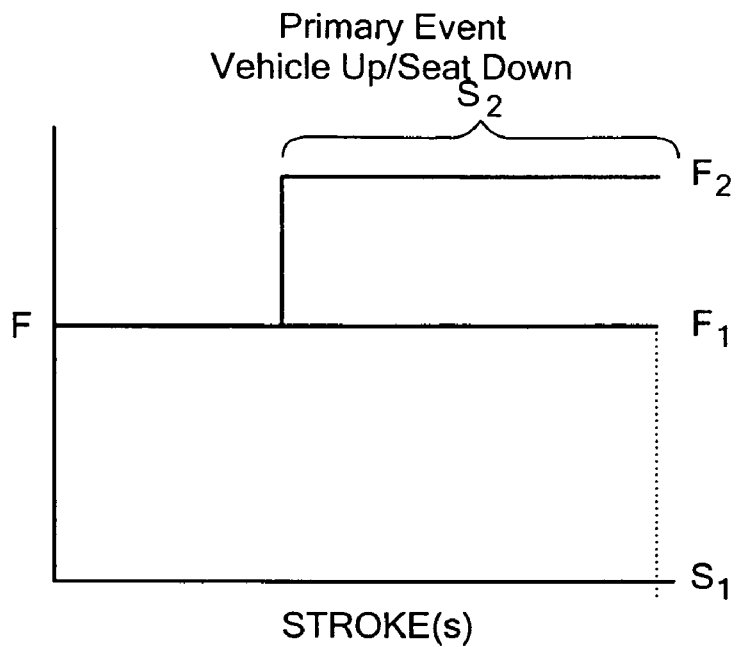
FIG. 5A is a graph showing the force (F) and stroke (S) relationship of the two damping subsystems of the subject invention during a primary event such as when the vehicle suffers a blast and moves up while the seat has as force exerted on it moving the seat down.
Figure 5B:
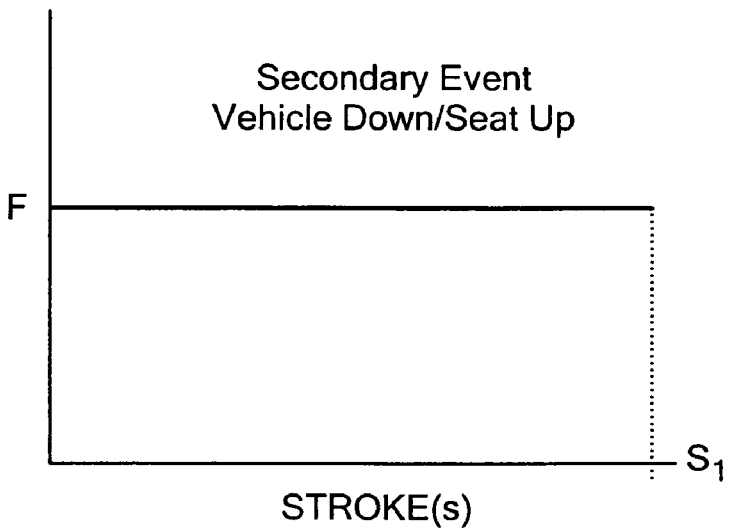
FIG. 5B is a graph showing the force (F) and stroke (S) relationship of a damping system in accordance with the subject invention during a secondary event when the vehicle is moving down and the seat is subject to a force moving the seat up.

As shown in FIGS. 5A and 5B, dampers 60a and 60b each apply a force $F_1$ (typically 300-500 lbs) over a long stroke $S_1$ (e.g., from 0 to 8 inches). Snubbers 62a and 62b, in contrast, typically apply a different force $F_2$ (e.g., 100-700 lbs) over a shorter stroke $S_2$ (e.g., from 4 inches to 8 inches). The design of the damper(s) and snubber(s) and the selection of $S_1$, $S_2$, $F_1$, and $F_2$ may vary depending on the application.

Figure 6:
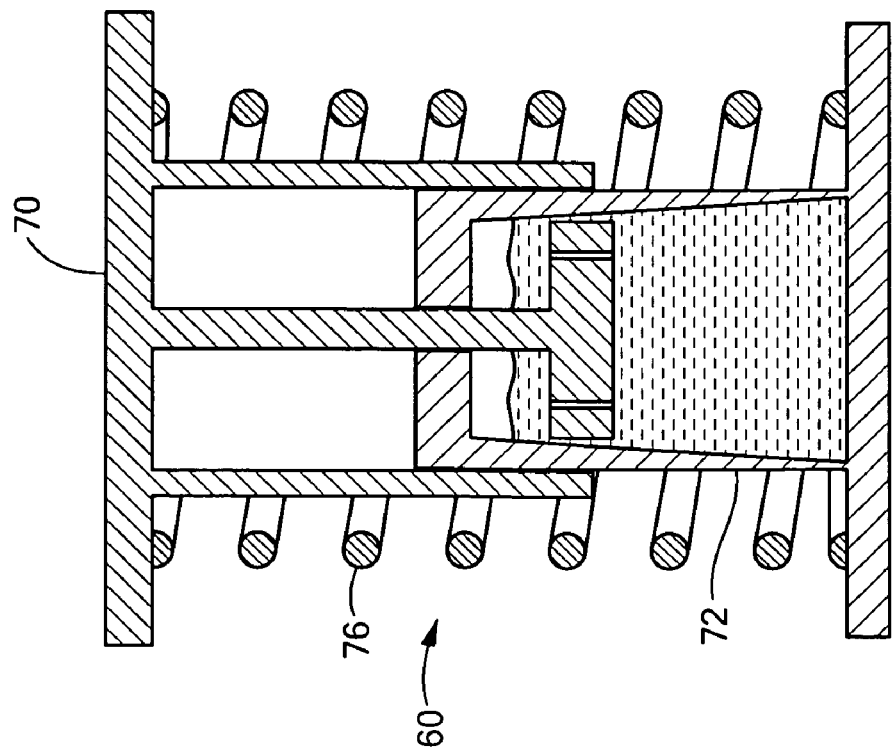
FIG. 6 is a highly schematic cross-sectional front view showing an example of one type of damping element in accordance with the subject invention.

FIG. 6 shows an example of damper 60 where piston assembly 70 is fixed to the seat base and cylinder 72 is fixed to the seat frame (see FIG. 3). Spring 76 may also be included about the piston and cylinder assembly allowing the system to reset automatically. During low-level accelerations, this combination provides ride comfort over a wide range of opposition positions. During high-level accelerations (such as IED events), the system provides and attenuation between the primary blast impulse, and partially resets to provide attenuation when the vehicle returns to the ground.

Figure 7:
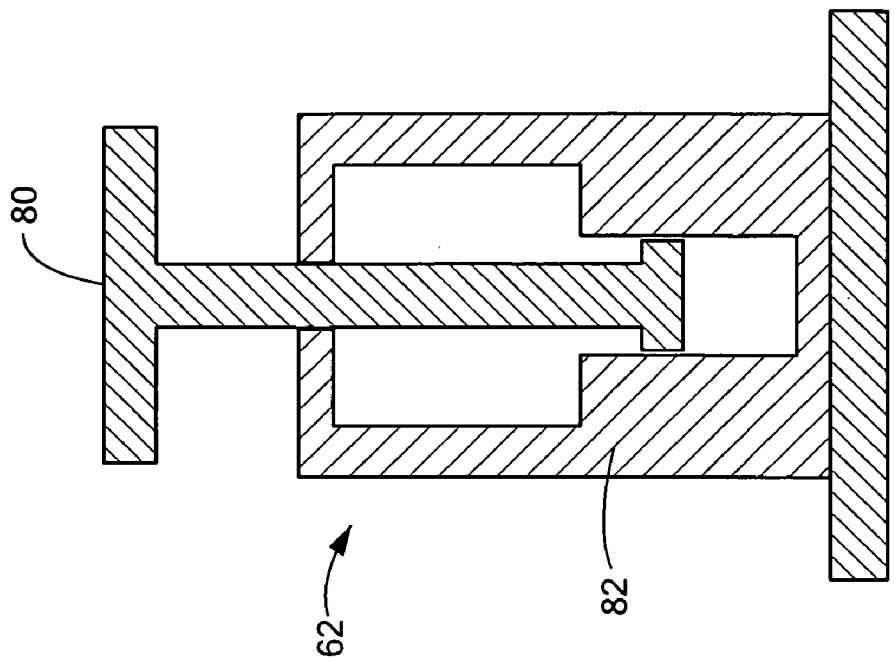
FIG. 7 is a schematic cross-sectional front view showing an example of another damping element in accordance with the subject invention.

FIG. 7 shows an example of snubber 62 with piston assembly 80 attached to the seat base and dual cavity cylinder 82 fixed to the seat frame. The force provided by the snubber increase the overall damping capacity by $F_2$, (FIG. 5) bringing any seat motion to a stop.

The result is a new blast mitigating seat intended for military vehicles such as the HMMWV, Mine Resistant Ambush Protected (MRAP) vehicles, and all terrain vehicles (MATVs) and other ground vehicles. In one preferred embodiment, the seat protects users against both the primary and secondary blast impacts of explosive. Testing demonstrated that the seat of a subject invention can reduce the level of acceleration of an occupant's spine or pelvis from 1,000 g to 20 g. The blast mitigating seat of the subject invention can reduce the forces imparted through an occupant's spine and pelvis due to survivorable levels. The damping subsystems are designed delay and limit the application of force between the vehicle and the seat. The seat is also ergonomically designed and the quick release restraint system provides for ride comfort, load planning advantages, and rapid egress. In one preferred embodiment, the seat is designed to meet the MIL-STD 1472 requirements for seating systems.

One damping subsystems employ a dual-direction hydraulic dampers capable of mitigating the forces transferred between the moving and fixed portions of the seat. The dual damping elements are mounted to the seat frame to reduce vertical as well as some portion of lateral loads during acceleration events. The force output of the damping subsystem varies with both speed and stoke providing maximum effective damping at the times of maximum input acceleration. Therefore, this dual damping subsystem limits accelerations imparted while minimizing the stoke needed for isolation.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A blast mitigating seat comprising:
a base;
a seat frame including:
a pan, and
a backrest including an open area for gear worn by a user;
a first damping subsystem between the base and the seat frame having a first force/stroke relationship for applying a force F1 over a stroke S1; and
a second damping subsystem between the base and the seat frame having a second force/stroke relationship for applying a force F2 over a stroke S2, in which F2 >F1 and S2 <S1.

2. The seat of claim 1 further including rails between a bottom of the seat frame and the pan for adjusting the pan fore and aft.

3. The seat of claim 1 in which the backrest includes two spaced columns attached to the seat frame.

4. The seat of claim 3 in which each column includes spaced pads.

5. The seat of claim 4 in which at least some of the spaced pads include an adjustment mechanism for adjusting the position of the pad on the column and the angle of the pad.

6. The seat of claim 1 in which the first damping subsystem and the second damping subsystem are configured to dissipate forces driving the seat frame down and the first damping subsystem is configured to dissipate forces driving the seat frame up.

7. The seat of claim 1 further including springs between said base and said seat frame.

8. The seat of claim 1 in which the base includes a bottom plate and spaced risers extending upwards therefrom.

9. The seat of claim 8 in which the first damping subsystem includes a piston-style shock absorber between each riser and the seat frame.

10. The seat of claim 1 further including a spall liner on the pan.

11. The seat of claim 1 further including a restraint subsystem.

12. The seat of claim 11 in which the restraint subsystem includes lap belt members and shoulder strap members all releasably received in a single buckle.

13. The seat of claim 12 in which each lap belt member and shoulder strap member extends from an automatic retracting mechanism.

14. The seat of claim 1 in which the second damping subsystem is a piston-style shock absorber.

15. The seat of claim 14 in which the second damping subsystem piston-style shock absorber includes a piston connected to the seat frame and a cylinder connected to the seat base.

16. The seat of claim 15 in which the cylinder includes first and second different size cavities.

17. A blast mitigating seat comprising:
a base;
a seat frame including:
a pan, and
a backrest including an open area for gear worn by a user;
means for dissipating forces driving the seat frame down including at least one damper applying a force F2 over a stroke S2; and
means for dissipating forces driving the seat frame up including at least one damper applying a force F1 over a stroke S1, in which F2 >F1, and S2 <S1.

18. A blast mitigating seat comprising:
a base including a bottom plate and spaced rearward risers extending upwards therefrom;
a seat frame including:
a pan adjustable with respect to said frame; and
a backrest including spaced columns extending upwardly from the seat frame, each said column including one or more adjustable pads;
a shock absorber extending between each said riser and the seat frame; and
first and second snubbers between the seat frame and the base.

19. The blast mitigating seat of claim 18 further including a spall liner on the pan.

20. The blast mitigating seat of claim 18 further including a restraint subsystem.

21. The blast mitigating seat of claim 20 in which the restraint subsystem includes lap belt members and shoulder strap members all releasably received in a single buckle.

22. The blast mitigating seat of claim 21 in which each lap belt member and shoulder strap member extends from an automatic retracting mechanism.

23. A blast mitigating seat comprising:
a base;
a seat frame including:
a pan, and
a backrest including an open area for gear worn by a user and including two spaced columns attached to the seat frame, each column including spaced pads;
a first damping subsystem between the base and the seat frame having a first force/stroke relationship; and
a second damping subsystem between the base and the seat frame having a second force/stroke relationship.

24. The seat of claim 23 in which the base includes a bottom plate and spaced risers extending upwards therefrom.

25. The seat of claim 24 in which the first damping subsystem includes a piston-style shock absorber between each riser and the seat frame.

26. The seat of claim 23 further including rails between a bottom of the seat frame and the pan for adjusting the pan fore and aft.

27. The seat of claim 23 in which at least some of the spaced pads include an adjustment mechanism for adjusting the position of the pad on the column and the angle of the pad.

28. The seat of claim 23 in which the first damping subsystem and the second damping subsystem are configured to dissipate forces driving the seat frame down and the first damping subsystem is configured to dissipate forces driving the seat frame up.

29. The seat of claim 23 in which the first damping system applies a force F1 over a stroke S1, the second damping subsystem applies a force F2 over a stroke S2, and F2 >F1 and S2 <S1.

30. The seat of claim 23 further including springs between said base and said seat frame.

31. The seat of claim 23 further including a spall liner on the pan.

32. The seat of claim 23 further including a restraint subsystem.

33. The seat of claim 32 in which the restraint subsystem includes lap belt members and shoulder strap members all releasably received in a single buckle.

34. The seat of claim 33 in which each lap belt member and shoulder strap member extends from an automatic retracting mechanism.

35. The seat of claim 23 in which the second damping subsystem is a piston-style shock absorber.

36. The seat of claim 35 in which the second damping subsystem piston-style shock absorber includes a piston connected to the seat frame and a cylinder connected to the seat base.

37. The seat of claim 36 in which the cylinder includes first and second different size cavities.

* * * * *